United States Patent [19]

Sakai

[11] Patent Number: 4,978,827
[45] Date of Patent: Dec. 18, 1990

[54] MACHINING TANK WITH DECOMPOSED GAS REMOVAL

[75] Inventor: Yozo Sakai, Aichi, Japan

[73] Assignee: Mitsubishi Denki Kabushiki Kaisha, Tokyo, Japan

[21] Appl. No.: 444,905

[22] Filed: Dec. 4, 1989

[30] Foreign Application Priority Data

Dec. 16, 1988 [JP] Japan .................................. 63-317769
Mar. 29, 1989 [JP] Japan .................................. 64-76988

[51] Int. Cl.$^5$ ......................... B23H 7/00; B23H 11/00
[52] U.S. Cl. ............................... 219/69.11; 219/69.14; 261/119.1
[58] Field of Search ................ 219/69.14, 69.11, 69.1; 261/119.1, 120; 204/129.1, 129.2, 224 M

[56] References Cited

U.S. PATENT DOCUMENTS

| | | | |
|---|---|---|---|
| 3,864,437 | 2/1975 | Blaszkowski | 261/120 |
| 3,878,352 | 4/1975 | Inoue | 219/69.14 |
| 4,577,082 | 3/1986 | Inoue | 219/69.14 |
| 4,590,352 | 5/1986 | Inoue | 219/69.14 |

FOREIGN PATENT DOCUMENTS

| | | |
|---|---|---|
| 61-136241 | 8/1986 | Japan . |
| 61-257411 | 11/1986 | Japan . |
| 62-68728 | 4/1987 | Japan . |
| 63-54477 | 4/1988 | Japan . |
| 134126 | 6/1988 | Japan .................. 219/69.11 |
| 63-113839 | 7/1988 | Japan . |

Primary Examiner—Philip H. Leung
Assistant Examiner—Geoffrey S. Evans
Attorney, Agent, or Firm—Sughrue, Mion, Zinn, Macpeak & Seas

[57] ABSTRACT

In a machining device comprising: a machining vessel containing a machining solution in which a workpiece has been immersed; air stream producing elements for producing a stream of air above the surface of the solution in the machining vessel in parallel with the solution surface; and air stream sucking elements for sucking the stream of air thus produced, thereby to remove gas produced from the solution during machining, the air stream producing elements and/or the air stream sucking elements are moved vertically to a predetermined height from the solution surface according to the level of the machining surface in the machining vessel, so that the gas thus produced is positively removed.

8 Claims, 2 Drawing Sheets

MACHINING TANK WITH DECOMPOSED GAS REMOVAL

BACKGROUND OF THE INVENTION

This invention relates to a machining device such as an which suffers from the decomposed gas and oil mist which may be produced during machining.

FIGS. 6 and 7 are a longitudinal sectional view and a plan view, respectively, showing an example of a conventional electrical discharge machine. In those figures, reference numeral 1 designates a machining vessel; 2, a workpiece in the machining vessel 1; 3, an electrode for machining the workpiece 2 by electric discharge; 4, the machining solution in the machining vessel 1: 5, decomposed gas of the machining solution which is produced in discharge machining; 6, the oil mist formed by vaporizing the machining solution at room temperature; 7, an air jetting unit provided above the machining vessel 1; 8, the stream of air produced by the air jetting unit 7; 9, an air sucking inlet 9 for sucking the stream of air thus produced; and 10, an air sucking unit.

In the conventional electrical discharge machine thus constructed, the decomposed gas 5 produced by electric discharging and the oil mist formed at room temperature are caused to flow on the stream of air formed above the machining vessel 1 into the air sucking inlet, thus being suitably processed.

As was described above, the air jetting unit 7 is installed above the machining vessel 1. Therefore, the stream of air produced by the air jetting unit 7 is merely a laminar stream. In an electric discharge machining operation, the level of the machining solution in the machining vessel changes depending on the size of the workpiece therein. Depending on the level of the machining solution, the decomposed gas hazardous to the human body cannot be detected immediately when it appears over the machining solution; that is, it is detected when dispersed fully in the machining vessel. It is difficult to detect the decomposed gas which is located near the walls of the machining vessel.

In this case, in order to increase the rate of detection of the decomposed gas, it is necessary to increase the pressure of the air jetting unit thereby to increase the speed of flow of the air. However, the method of increasing the air jetting pressure is disadvantageous in that the electrical discharge machine is increased in equipment cost, and an electrical discharge machining operation cannot be achieved with high accuracy because the machine is locally changed in temperature.

SUMMARY OF THE INVENTION

Accordingly, an object of this invention is to eliminate the above-described difficulties accompanying a conventional electrical discharge machine.

More specifically, an object of the invention is to provide an electrical discharge machine in which the decomposed gas hazardous to the human body can be detected with high accuracy.

The foregoing objects and other objects of the invention has been achieved by the provision of a machining device comprising: a solution in which a workpiece is immersed for acceleration of a machining operation; a machining vessel containing the solution in which a workpiece has been immersed; air stream producing means for producing a stream of air above the surface of the solution in the machining vessel in such a manner that the stream of air flows in parallel with the surface of the solution in the machining vessel; and air stream sucking means for sucking the stream of air thus produced, thereby to remove gas produced from the solution during machining, which, according to a first aspect of the invention, further comprises: means for detecting the level of the solution in the machining vessel; and means for moving at least one of the air stream producing means and air stream sucking means to a predetermined position according to the level thus detected of the solution in the machining vessel, and by the provision of a machining device comprising: a solution in which a workpiece is immersed for acceleration of a machining operation; a machining vessel containing the solution in which a workpiece has been immersed; air stream producing means for producing a stream of air above the surface of the solution in the machining vessel in such a manner that the stream of air flows in parallel with the surface of the solution in the machining vessel; and air stream sucking means for sucking the stream of air thus produced, thereby to remove gas produced from the solution during machining, which, according to a second aspect of the invention, further comprises: means for positioning at least one of the air stream producing means and air stream sucking means at a height from the surface of the solution in the machining vessel irrespective of the change in level of the solution in the machining vessel.

In the machining device according to the first aspect of the invention, when the level of the machining solution is detected by the solution level detecting means, a drive unit operates to move the air stream producing means and/or the air stream sucking means, so that the stream of air is formed at a predetermined height from the solution surface.

In the machining device according to the second aspect of the invention, a level setting member for setting the level of the machining solution is provided, and the air stream producing means and/or the air stream sucking means is moved vertically in association with the displacement of the level setting member, so that the stream of air is proved at a predetermined height from the surface of the machining solution in the machining vessel.

The nature, principle and utility of the invention will become more apparent from the following detailed description when read in conjunction with the accompanying drawings, in which like parts are designated by like reference numerals or characters:

DETAILED DESCRIPTION OF THE INVENTION

Figure 1:
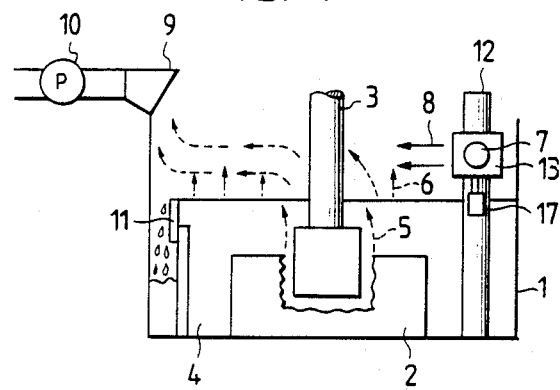
FIGS. 1 and 2 are longitudinal sectional view and a plan view, respectively, showing one example of an electrical discharge machine according to this invention.
Figure 2:
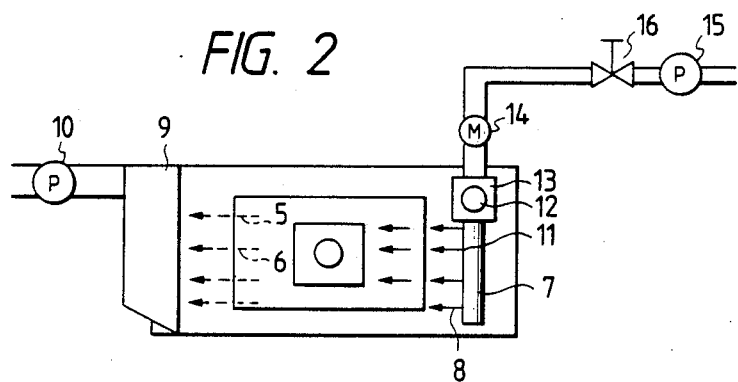
Figure 3:
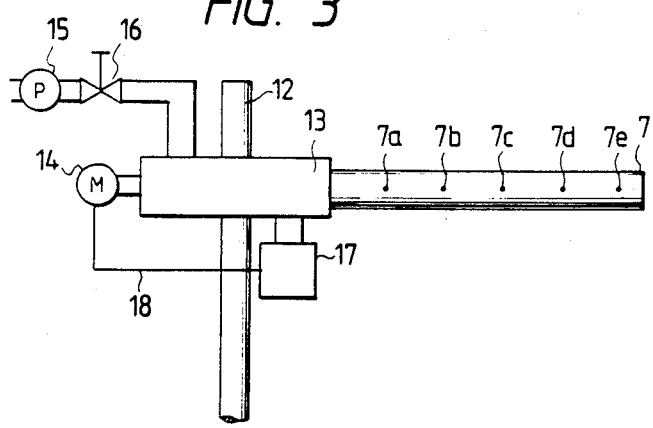
FIG. 3 is a front view of an air jetting unit in the electrical discharge machine shown in FIGS. 1 and 2.
Figure 6:
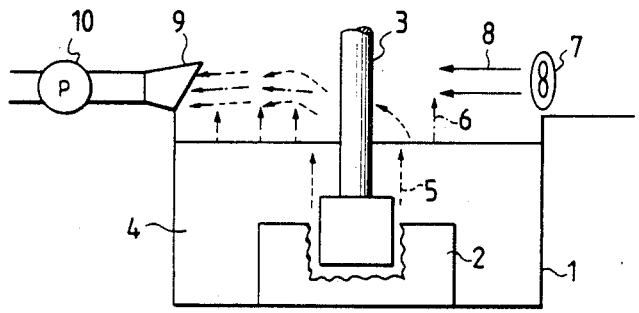
FIGS. 6 and 7 are a longitudinal sectional view and a plan view, respectively, showing an example of a conventional electrical discharge machine.
Figure 7:
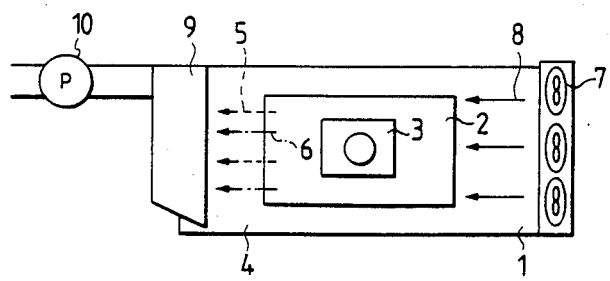

A first example of an electrical discharge machine according to this invention will be described with reference to FIGS. 1, 2 and 3, in which those components which have been already described with reference to FIGS. 6 and 7 are therefore designated by the same reference numerals.

The electrical discharge machine further comprises: a post 12 held upright in the machining vessel 1; an air pressure supplying block 13 which is lifted along the post 12 by a drive unit 14; a solution level detector which is located at a predetermined distance from the air jetting holes 7a through 7e formed in the air jetting unit 7 which is secured to the air jetting unit 7; a signal line 18 for transmitting the output of the detector 17 to the drive unit 14; a pump 15 for producing the air pressure which is supplied to the air pressure supplying block 13; a control valve 16 for adjusting the air pressure thus produced; and a dam 11 board for determining the level of the machining solution in the machining vessel 1.

In the electrical discharge mac air pressure produced by the pump 15 is adjusted optimully by operating the control valve 16 and supplied through the air pressure supplying block 13 and the air jetting unit 7 to the air jetting holes 7a through 7e, thus forming the stream of air 8 over the machining solution 4. The stream of air 8 thus formed is sucked together with the decomposed gas 5 and the oil mist 6 by the air sucking unit 9 provided on the opposite side, so that the decomposed gas and the oil mist are suitably processed. On the other hand, the solution level detector 17 detects the change in level of the machining solution 4 in the machining vessel 1, to output a detection signal corresponding to the change. The detection signal is applied through the signal line 18 to the drive unit 14.

In response to the detection signal, the drive unit 14 operates to move the air pressure supplying block 13 vertically so that the air jetting holes 7a through 7e are at a predetermined height from the level of the machining solution 4. Therefore, the decomposed gas 5 and the oil mist 6 can be caught with high efficiency, so that the environmental condition is improved greatly. Furthermore, decreasing the air pressure as much as possible will suppress the non-uniform thermal distribution in the machine body. Thus, not only the environmental condition around the electrical discharge machine is improved, but also the electric discharge machining operation can be achieved with high accuracy.

In the above-described embodiment, the solution level detector 17 is positioned at the predetermined height from the air jetting holes 7a through 7e. However, the height may be changed according to the configuration of the workpiece and the electrode by using a numerical control program.

Furthermore in the above-described embodiment, the solution level detector 17 is employed to detect the level of the machining solution; however, it may be replaced with any means which can detect the level of the machining solution. For instance, it may be a float.

A second example of the machining device according to the invention will be described with reference to FIGS. 4 and 5. In the above-described first example of the machining device, the level of the machining solution is detected, and the decomposed gas and the oil mist are sucked in association with the detection of the solution level. In the second example, the sucking operation is effected in association with the displacement of a member which determines the solution level.

Figure 4:
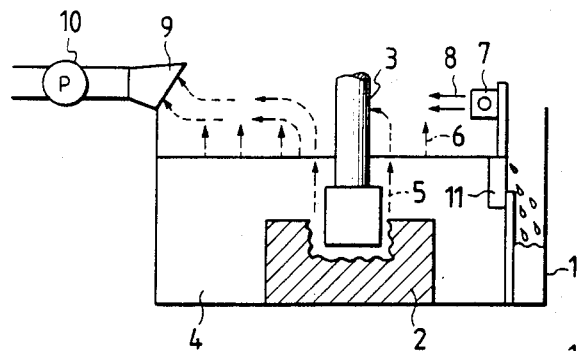
FIGS. 4 and 5 are a longitudinal sectional view and a plan view, respectively, showing another example of the electrical discharge machine according to the invention.
Figure 5:
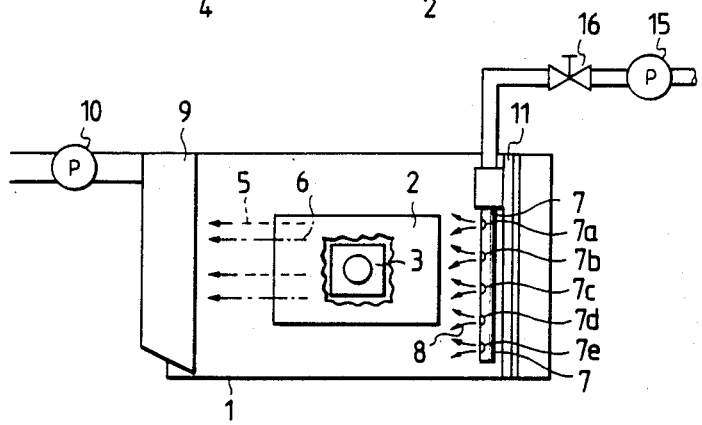

In FIGS. 4 and 5, reference numerals 1 through 10 designate the same components as those in the above-described conventional electrical discharge machine; 11, a dam board for determining the level of the machining solution 4, the dam board 11 being coupled to the air jetting unit 7; 15, a pump for producing the air pressure which is supplied to the air jetting unit 7; and 16, a control valve for adjusting the air pressure thus produced.

The dam board 11 is movable vertically. Its upper edge determined the level of the machining solution 14 in the machining vessel 1. Therefore, even when the solution level is raised by additionally supplying the machining solution 4 into the machining vessel 1 or immersing the workpiece 2 or the electrode 3, the machining solution flows over the dam board, as a result of which the solution level is determined by the position of the dam board 11.

That is, the machining device shown in FIGS. 4 and 5 is made up of: the dam board for setting the level of the machining solution; and the air jetting unit 7 having the air jetting holes 7a through 7e which is secured to the dam board and operates in association with the displacement of the dam board so that the air jetting holes is at a predetermined height from the surface of the machining solution at all times.

In the electrical discharge machine thus constructed, the air pressure provided by the pump 15 is adjusted optimum by the control valve 16, and the air jetting unit 7 provides a laminar stream of air above the machining solution 4. The decomposed gas 5 and the oil mist 6 are sucked together with the laminar stream of air 8 through the sucking inlet 9 disposed on the opposite side of the machining vessel 1, and suitably processed. The air jetting unit 7 secured to the dam board 11 adapted to set the level of the machining solution 4 is held at a predetermined height from the solution surface. Hence, the decomposed gas 5 produced by machining a workpiece, and the oil mist 6 produced during machining are efficiently caught and recovered without adjustment. As a result, the environmental condition is improved greatly, and decreasing the air pressure as much as possible will suppress the non-uniform thermal distribution in the machine body. Thus, automation of the electrical discharge machine, improvement of the environmental condition, and machining a workpiece with high accuracy can be obtained according to the invention.

In the above-described two embodiments of the invention, air is jetted through the air jetting holes 7a through 7e; however, they may be replaced any other means which can produce streams of air.

Furthermore, in the above-described embodiments, the air stream producing means is movable; however, instead of the air stream producing means, the air stream sucking means may be made movable; or both of the air stream producing means and air stream sucking means may be made movable.

While the invention has been described with reference to the electrical discharge machine, the technical concept of the invention may be applied to any machining device in which gas is produced and it should be removed.

As was described above, according to the invention, at least one of the air stream producing means and air stream sucking means is movable vertically so that it operates in association with the change in level of the machining solution thereby to provide the stream of air at a certain height from the solution surface. Therefore, the unwanted gas can be removed with a small quantity of air, which results in automation of a machining device, improvement of the environmental condition around the machining device, and machining a workpiece with high accuracy.

While a few embodiments of the invention have been illustrated and described in detail, it is particularly understood that the invention is not limited thereto or thereby.

What is claimed is:

1. A machining device comprising: a solution in which a workpiece is immersed for acceleration of a machining operation; a machining vessel containing said solution in which said workpiece has been immersed; air stream producing means for producing a stream of air above the surface of said solution in said machining vessel in such a manner that said stream of air flows in parallel with the surface of said solution in said machining vessel; and air stream sucking means for sucking said stream of air thus produced, thereby to remove gas produced from said solution during machining, which further comprises: means for positioning at least one of said air stream producing means and air stream sucking means to a predetermined height from the surface of said solution in said machining vessel irrespective of a change in the level of said solution in said machining vessel.

2. A machining device according to claim 1, in which said positioning means comprises a dam board for setting the level of said solution and said air stream producing means comprises an air jetting unit having air jetting holes which is secured to said dam board and operates in association with the displacement of the dam board so that the air jetting holes is at said predetermined height from the surface of said solution at all times.

3. A machining device according to claim 2, in which said air jetting unit secured to said dam board adapted to set the level of the solution is held at said predetermined height from the solution surface.

4. A machining device according to claim 3, in which said dam board is movable vertically.

5. A machining device according to claim 1, in which said positioning means comprises:
   means for detecting the level of said solution in said machining vessel; and
   means for moving at least one of said air stream producing means and air stream sucking means to said predetermined height according to the level thus detected of said solution in said machining vessel.

6. A machining device according to claim 5, in which said detecting means is a solution level detector detecting the change in level of said solution in said machining vessel, to output a detection signal corresponding to the change.

7. A machining device according to claim 6, in which said moving means comprises;
   a post held upright in the machining vessel;
   an air pressure supplying block cooperating with said air stream producing means,
   a drive unit for lifting said air pressure supplying block along said post; and
   a signal line for transmitting the ourput of the detector to said drive unit.

8. A machining device according to claim 7, in which said drive unit is vertically moved in response to the detection signal in such a manner that said air stream producing means are at said predeternind height from the level of the solution.

* * * * *